US011969775B2

(12) United States Patent
Breen et al.

(10) Patent No.: US 11,969,775 B2
(45) Date of Patent: Apr. 30, 2024

(54) STOCK LIFTER ASSEMBLY

(71) Applicant: STANDARD LIFTERS, INC., Grand Rapids, MI (US)

(72) Inventors: Scott M. Breen, Ada, MI (US); Joel T. Pyper, Holland, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 0 days.

(21) Appl. No.: 18/206,142

(22) Filed: Jun. 6, 2023

(65) Prior Publication Data

US 2023/0311190 A1 Oct. 5, 2023

Related U.S. Application Data

(63) Continuation of application No. 17/685,852, filed on Mar. 3, 2022, now Pat. No. 11,707,775, which is a (Continued)

(51) Int. Cl.

| | |
|---|---|
| ***B21D 37/08*** | (2006.01) |
| ***B21D 43/02*** | (2006.01) |

(Continued)

(52) U.S. Cl.

CPC ........... *B21D 37/08* (2013.01); *B21D 43/023* (2013.01); *B21D 45/02* (2013.01); *B21J 9/022* (2013.01);

(Continued)

(58) Field of Classification Search

CPC ...... B21D 37/02; B21D 37/08; B21D 43/021; B21D 43/04; B21D 43/05; B21D 43/003; B21D 43/10; B21D 45/06; B21D 45/00

See application file for complete search history.

(56) References Cited

U.S. PATENT DOCUMENTS

| | | | |
|---|---|---|---|
| 2,168,377 | A | 8/1939 | Wales |
| 2,314,138 | A | 3/1943 | Garbe et al. |

(Continued)

FOREIGN PATENT DOCUMENTS

| | | |
|---|---|---|
| FR | 2966370 | 4/2012 |
| JP | 56084130 | 7/1981 |

(Continued)

OTHER PUBLICATIONS

Ajacs Die Sales Corporation, "Pilot Retainer" sales brochures, Grand Rapids, MI (date unknown).

(Continued)

*Primary Examiner* — Debra M Sullivan
(74) *Attorney, Agent, or Firm* — PRICE HENEVELD LLP

(57) ABSTRACT

A stock lifter for metal forming dies includes a self-contained assembly. The assembly includes a guide pin that reciprocates within a base. A hardened end cap, which contacts the stock, is attached to the guide pin. A spring is located on the exterior surface of a portion of the base and surrounds the guide pin body. One end of the spring contacts a surface on the cap, while the other end of the spring contacts a surface on the base or an optional mounting flange that is attached above the base. Thus, the stock lifter assembly has a hardened cap for the stock to slide on and a larger, externally mounted spring that provides longer life for the stock lifter. The stock lifter assembly can be made of several different lengths and sizes by using longer or wider guide pins and springs.

20 Claims, 17 Drawing Sheets

Related U.S. Application Data continuation-in-part of application No. 16/726,307, filed on Dec. 24, 2019, now Pat. No. 11,267,036.

(60) Provisional application No. 62/785,393, filed on Dec. 27, 2018.

(51) Int. Cl.

| | |
|---|---|
| ***B21D 45/02*** | (2006.01) |
| ***B21J 9/02*** | (2006.01) |
| ***B21J 13/14*** | (2006.01) |
| ***B30B 15/02*** | (2006.01) |
| ***B30B 15/32*** | (2006.01) |

(52) U.S. Cl.

CPC ............. *B21J 13/14* (2013.01); *B30B 15/028* (2013.01); *B30B 15/32* (2013.01)

(56) References Cited

U.S. PATENT DOCUMENTS

| | | | |
|---|---|---|---|
| 2,346,297 | A | 4/1944 | Garbe |
| 2,616,763 | A | 11/1952 | Vose et al. |
| 2,979,004 | A | 4/1961 | Kenville et al. |
| 3,292,412 | A | 12/1966 | Anthony |
| 3,335,627 | A | 8/1967 | Smelts |
| 3,620,113 | A | 11/1971 | Gargrave |
| 3,722,257 | A | 3/1973 | Whitacre et al. |
| 3,804,265 | A | 4/1974 | Wolf |
| 3,848,452 | A | 11/1974 | Gargrave |
| 3,848,494 | A | 11/1974 | Gargrave et al. |
| 3,860,803 | A | 1/1975 | Levine |
| 3,908,500 | A | 9/1975 | Gargrave et al. |
| 3,945,230 | A | 3/1976 | Tomioka et al. |
| 3,998,369 | A | 12/1976 | Grosjean et al. |
| 4,031,787 | A | 6/1977 | Cady |
| 4,033,168 | A | 7/1977 | Fisk |
| 4,235,089 | A | 11/1980 | Vecchi |
| 4,254,999 | A | 3/1981 | Davidson |
| 4,282,736 | A | 8/1981 | Mashburn |
| 4,326,402 | A | 4/1982 | Wallis |
| 4,342,214 | A | 8/1982 | Neuendorf |
| 4,424,639 | A | 1/1984 | Richardson |
| 4,553,445 | A | 11/1985 | Holbrook et al. |
| 4,575,937 | A | 3/1986 | McCullough |
| 4,644,836 | A | 2/1987 | Wepner et al. |
| 4,676,090 | A | 6/1987 | Nishimura et al. |
| 4,704,890 | A | 11/1987 | Vrignaud |
| 4,706,696 | A | 11/1987 | Gillis |
| 4,809,533 | A | 3/1989 | Owens |
| 4,916,931 | A | 4/1990 | Kaeseler |
| 4,945,749 | A | 8/1990 | Walker et al. |
| 4,993,295 | A | 2/1991 | Dacey, Jr. |
| 5,001,922 | A | 3/1991 | Kranis, Sr. et al. |
| 5,099,673 | A | 3/1992 | Baur |
| 5,143,743 | A | 9/1992 | Wilde et al. |
| 5,168,745 | A | 12/1992 | Miyagawa et al. |
| 5,253,505 | A | 10/1993 | Baur |
| 5,301,119 | A | 4/1994 | Watkins |
| 5,335,529 | A | 8/1994 | Crowdus et al. |
| 5,540,073 | A | 7/1996 | Kirii |
| 5,706,696 | A | 1/1998 | Wagner |
| 5,722,280 | A | 3/1998 | Bodnar |
| 5,860,315 | A | 1/1999 | Sawdon |
| 5,931,074 | A | 8/1999 | Matsuoka |
| 5,954,175 | A | 9/1999 | Haas et al. |
| 5,974,852 | A | 11/1999 | Nieschulz |
| 5,983,688 | A | 11/1999 | Anzal et al. |
| 6,047,579 | A | 4/2000 | Schmitz |
| 6,134,938 | A | 10/2000 | Ohtsuka |
| 6,170,809 | B1 | 1/2001 | Cotter |
| 6,651,304 | B2 | 11/2003 | McGlinchy et al. |
| 6,848,290 | B2 | 2/2005 | Pyper et al. |
| 6,895,797 | B2 | 5/2005 | Lowry et al. |
| 7,021,113 | B1 | 4/2006 | Peterson et al. |
| 7,024,910 | B2 | 4/2006 | Pyper et al. |
| 7,152,451 | B1 | 12/2006 | Cotter |
| 7,581,475 | B2 | 9/2009 | Moellering |
| 7,694,399 | B2 | 4/2010 | Sawdon et al. |
| 7,913,369 | B2 | 3/2011 | Gakovic |
| 8,146,399 | B2 | 4/2012 | Pyper et al. |
| 8,151,619 | B2 | 4/2012 | Pyper et al. |
| 8,844,335 | B2 | 9/2014 | Pyper et al. |
| 8,950,233 | B2 | 2/2015 | Pyper et al. |
| 8,955,364 | B2 | 2/2015 | Breen et al. |
| 9,010,169 | B2 | 4/2015 | Breen et al. |
| 9,067,253 | B2 | 6/2015 | Pyper et al. |
| 9,375,777 | B2 | 6/2016 | Breen et al. |
| 9,694,411 | B2 | 7/2017 | Breen et al. |
| 9,737,923 | B2 | 8/2017 | Breen et al. |
| 10,384,259 | B2 | 8/2019 | Breen et al. |
| 2006/0193937 | A1 | 8/2006 | Gakovic |
| 2009/0044671 | A1 | 2/2009 | Greenleaf |
| 2009/0193865 | A1 | 8/2009 | Pyper et al. |
| 2009/0193951 | A1 | 8/2009 | Pyper et al. |
| 2011/0296893 | A1* | 12/2011 | Breen .................... B21D 37/12 470/8 |
| 2013/0091920 | A1 | 4/2013 | Breen et al. |
| 2013/0167612 | A1 | 7/2013 | Breen et al. |
| 2013/0255350 | A1 | 10/2013 | Schneider et al. |
| 2014/0013816 | A1* | 1/2014 | Breen ...................... B21K 1/76 29/428 |
| 2014/0144202 | A1 | 5/2014 | Pyper et al. |
| 2015/0306654 | A1 | 10/2015 | Breen et al. |

FOREIGN PATENT DOCUMENTS

| | | |
|---|---|---|
| JP | 56122634 | 9/1981 |
| JP | 57100825 | 6/1982 |
| JP | 4059139 | 2/1992 |
| JP | 06142788 | 5/1994 |
| JP | 07155867 | 6/1995 |
| KR | 1020010069897 | 7/2001 |
| KR | 1020060104028 | 10/2006 |
| KR | 1020060128723 | 10/2007 |
| SU | 604608 | 4/1978 |
| SU | 1065064 | 1/1984 |
| WO | 2016073583 | 5/2016 |

OTHER PUBLICATIONS

DADCO, Inc., “Two Post Direct Lift,” p. 1, USA (dated prior to Oct. 10, 2001) (best copy available).

Dayton Progress Corporation, “Regular Pilots” catalog, pp. 9, 11, 13, Dayton, OH (date unknown).

Fibro Inc., “Pilot Units to Daimler Standards” catalog, p. E72, Rockford, IL (date unknown).

Misumi Corporation, “Pilot Punches” caalog, pp. 202, 220, 228, 234, 242, 946, 948, Schaumberg, IL (date unknown).

Modern Die Systems Inc., “Die Accessories” sales brochure, Ellwood, IN (date unknown). 1 page.

PHD Inc., “Series SCV Slides,” USA (dated prior to Oct. 10, 2001) (best copy available), 2 pages.

Standard Lifters Inc., “Pilot Assembly” sales brochure, Grand Rapids, MI (Oct. 2011), 15 pages.

Standard Lifters Inc., “Pilot Sleeve” sales brochure, Grand Rapids, MI (Jan. 2012), 18 pages.

Standard Lifters Inc., “Prior Art Stock Guide Methods” publication, p. 20 (dated approximately Feb. 1, 2012).

Standard Lifters Inc., “Stock Guide Application,” p. 5 (publication date Feb. 1, 2012).

* cited by examiner

STOCK LIFTER ASSEMBLY

CROSS REFERENCE TO RELATED APPLICATION AND CLAIM OF PRIORITY

The present application is a continuation of and claims priority under 35 U.S.C. § 120 to commonly assigned U.S. Pat. No. 11,707,775, issued Jul. 25, 2023, entitled STOCK LIFTER ASSEMBLY, which is a continuation-in-part of and claims priority under 35 U.S.C. § 120 to commonly assigned U.S. Pat. No. 11,267,036, issued Mar. 8, 2022, entitled STOCK LIFTER ASSEMBLY, which claims the priority benefits under the provisions of 35 U.S.C. § 119, basing said claim of priority on related U.S. Provisional Application No. 62/785,393 filed Dec. 27, 2018, which is incorporated in its entirety herein by reference.

BACKGROUND OF THE INVENTION

The present invention relates to metal forming dies and the like, and in particular to a stock lifter assembly and associated method incorporating a unique stock lifter assembly.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one-of-a-kind assemblies for a particular part, with each of the various components being handcrafted and custom mounted or fitted in an associated die set, which is in turn positioned in a stamping press. Not only are the punches and the other forming tools in the die set individually designed and constructed, but the other parts of the die set, such as stock lifters, guides, end caps, keepers, cam returns, etc., are also custom designed, and installed in the die set. Current die making processes require carefully machined, precision holes and recesses in the die set for mounting the individual components, such that the same are quite labor intensive, and require substantial lead time to make, test, and set up in a stamping press. Consequently, such metal forming dies are very expensive to design, manufacture, and repair or modify.

The primary application for a lifter in a progressive stamping die is to lift the metal stock off of the tooling surfaces to move (progress) the stock to the next working station within the die. A stock lifter generally consists of a hardened round pin guided in a drilled hole through a steel block and a driving force behind the pin. The pin is usually retained by an oversized head on the pin on the backside of the block. The problem with such lifting assemblies are the number of components and the space that such components take within the die assembly. In addition, due to the driving force, shearing of the guiding component and/or the retaining pin can occur.

Thus, a product that solves these problems would be advantageous and is described herein.

SUMMARY OF THE INVENTION

One aspect of the present invention is a multi-station progressive metal forming die having at least two mutually converging and diverging die members between which a stock piece is shifted longitudinally to form at least one part from the stock incorporating a stock lifter assembly. The stock lifter assembly includes a generally cylindrical guide pin body. The guide pin body has an outer end portion that is oriented toward the stock piece. The guide pin body also has an inner end portion oriented away from the stock piece. The generally cylindrical guide pin body also has a medial portion between the outer end portion of the inner end portion. The outer end portion of the guide pin body has an outer end surface with a cap aperture. The outer end portion also has a securing member aperture on the generally cylindrical guide pin body. The inner end portion of the guide pin body includes a retainer groove on the generally cylindrical guide pin body. The stock lifter assembly includes a cap that has an outer end portion oriented toward the stock piece and an inner end portion oriented away from the stock piece. The outer end portion has a diameter that is wider than the diameter of the generally cylindrical guide pin body. The outer end portion also includes an outer end surface that contacts the stock piece. The inner end portion of the cap has a diameter that is sized to be received within the cap aperture in the outer end portion of the guide pin body. The inner end portion includes a securing member aperture that aligns with the securing member aperture in the outer end portion of the guide pin body when the cap is situated on the guide pin body. A securing member is received within the securing member apertures in the cap and guide pin body. The stock lifter assembly includes a base that has an outer end portion oriented toward the stock piece and an inner end portion oriented away from the stock piece. The base also has a guide pin aperture extending through the base. The outer end portion of the base has a first diameter, and the inner end portion has a larger second diameter, forming a shoulder on the exterior surface of the base. The inner end portion of the base also has an inner end surface. The stock lifter assembly includes a spring member that has a generally hollow interior with an outer end portion oriented toward the stock piece and an inner end portion oriented away from the stock piece. The outer end portion of the spring member contacts a surface of the outer end portion of the cap. The inner end portion of the spring member contacts the exterior shoulder formed on the base. The stock lifter assembly includes a retainer that is received on the retainer groove on the guide pin body. The retainer will contact the inner end surface of the base when the stock lifter assembly is fully raised.

Another aspect of the present invention is a stock lifter assembly for a metal forming die, in which stock is formed into at least one part. The stock lifter assembly includes a generally cylindrical guide pin body with an outer end portion oriented toward the stock and an inner end portion oriented away from the stock. The outer end portion includes an outer end surface with a cap aperture, and a securing member aperture on the generally cylindrical guide pin body. The inner end portion of the guide pin body includes a retainer groove. The stock lifter assembly includes a cap that has an outer end portion oriented toward the stock and an inner end portion oriented away from the stock. The outer end portion has a diameter that is wider than the diameter of the generally cylindrical guide pin body. The cap also has an outer end surface that contacts the stock. The inner end portion of the cap has a diameter that is sized to be received within the cap aperture in the guide pin body. The cap also has a securing member aperture that aligns with the securing member aperture in the guide pin body when the cap is installed on the guide pin body. The stock lifter assembly includes a securing member that is received within the securing member aperture in the inner end portion of the cap and the securing member aperture in the guide pin body. The stock lifter assembly includes a base that has an outer end portion oriented toward the stock and an inner end portion oriented away from the stock. The base also has a guide pin aperture that extends through the base. The outer end portion of the base has a first diameter, and the inner end portion has a larger second diameter, thereby forming a shoulder on the exterior surface of the base. The stock lifter assembly also has a spring member that has a generally hollow interior with an outer end portion that contacts the surface of the cap, and an inner end portion that contacts the surface of a mounting flange when a mounting flange is installed in the base. The stock lifter assembly includes a retainer that is received on the retainer groove located on the guide pin body. The retainer will contact the inner end surface of the base when the stock lifter assembly is fully raised.

Yet another aspect of the present invention is a stock lifter assembly for metal forming die in which stock is formed into at least one part. The stock lifter assembly includes a generally cylindrical guide pin body with an outer end portion oriented toward the stock and an inner end portion oriented away from the stock. The outer end of the guide pin body includes an outer end surface with a cap aperture, and a securing member aperture on the cylindrical portion of the guide pin body. The inner end portion of the guide pin body has a retainer groove formed on the cylindrical surface of the guide pin body. The stock lifter assembly includes a cap that has an outer end portion oriented toward the stock and an inner end portion oriented away from the stock. The outer end portion has a diameter that is wider than the diameter of the guide pin body. The outer end portion also has an outer end surface that contacts the stock. The inner end portion of the cap has a diameter that is received within the cap aperture in the guide pin body. The inner end portion also includes a securing member aperture that aligns with the securing member aperture in the guide pin body when the cap is installed on the guide pin body. The stock lifter assembly includes a securing member that is received in the securing member apertures in the cap and the guide pin body. The stock lifter assembly includes a base that has an outer end portion oriented toward the stock and an inner end portion that is oriented away from the stock, with a guide pin aperture extending through the base. The outer end portion of the base has a first diameter, and the inner end portion has a larger second diameter, such that a shoulder is formed on the exterior surface of the base. The base also includes an inner end surface. The stock lifter assembly includes a spring member that has a generally hollow interior with an outer end portion oriented toward the stock and an inner end portion oriented away from the stock. The outer end portion contacts a surface of the cap, and the inner end portion contacts a surface of the shoulder on the exterior surface of the base. A retainer is received on a retainer groove on the guide pin body. The retainer will contact the inner end surface of the base when the stock lifter assembly is fully raised.

These and other advantages of the invention will be further understood and appreciated by those skilled in the art by reference to the following written description, claims, and dependent drawings.

DETAILED DESCRIPTION OF THE PREFERRED EMBODIMENTS

Figure 1:
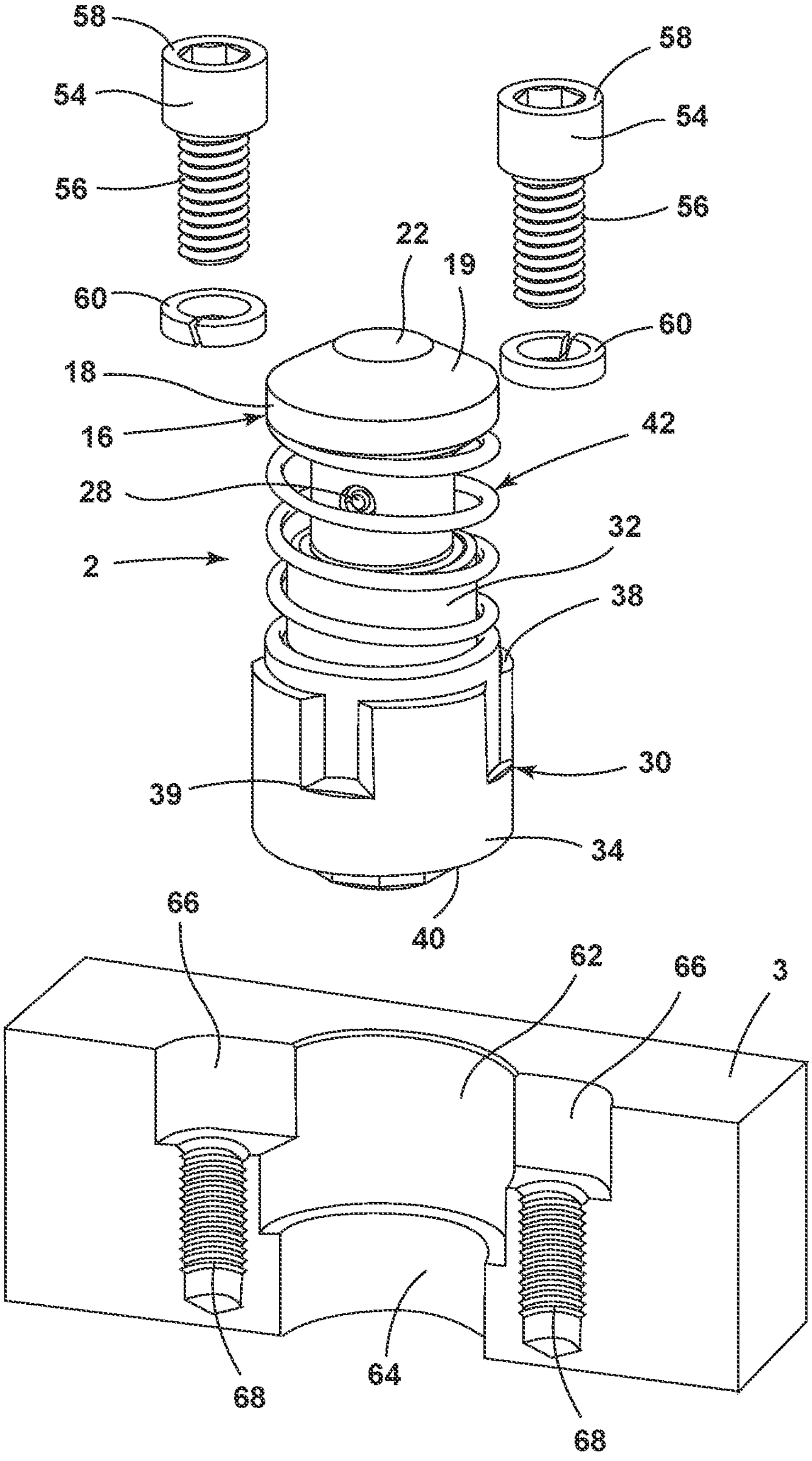
FIG. 1 is a perspective view of an embodiment of the stock lifter assembly embodying the present invention with the die member shown in cross section.

For purposes of description herein, the terms "outer," "inner," "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-2, 4, 5, 7, 8, and 10-16 generally designate a stock lifter assembly embodying an aspect of the present invention. As shown in FIGS. 1, 10-13, the stock lifter assembly 2 is particularly adapted for use in conjunction with a die member 3 of a multi-stage progressive metal forming die having at least two mutually converging and diverging die members between which a stock 5 is shifted longitudinally to form one or more parts from the stock 5.

The stock lifter assembly 2 includes a guide pin body 4, a cap 16, a securing member 28, a base 30, a spring member 42, and a retainer 50. In addition, the stock lifter assembly 2 can optionally include a mounting flange 70 or a mounting block 92 to assist with installation of the stock lifter assembly 2 to the die member 3.

Figure 14:
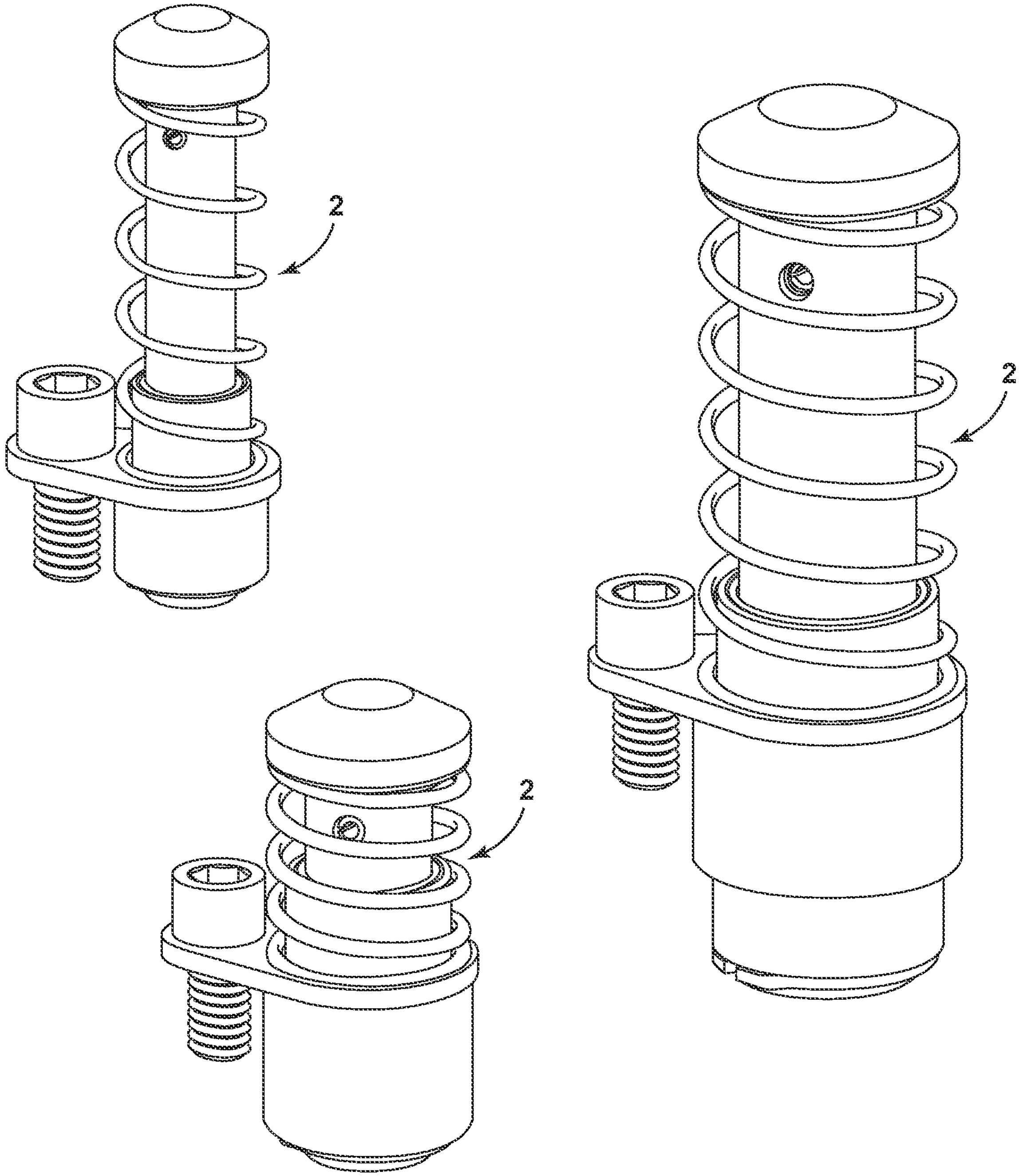
FIG. 14 is a perspective view of three stock lifter assemblies having different widths and lengths.
Figure 15:
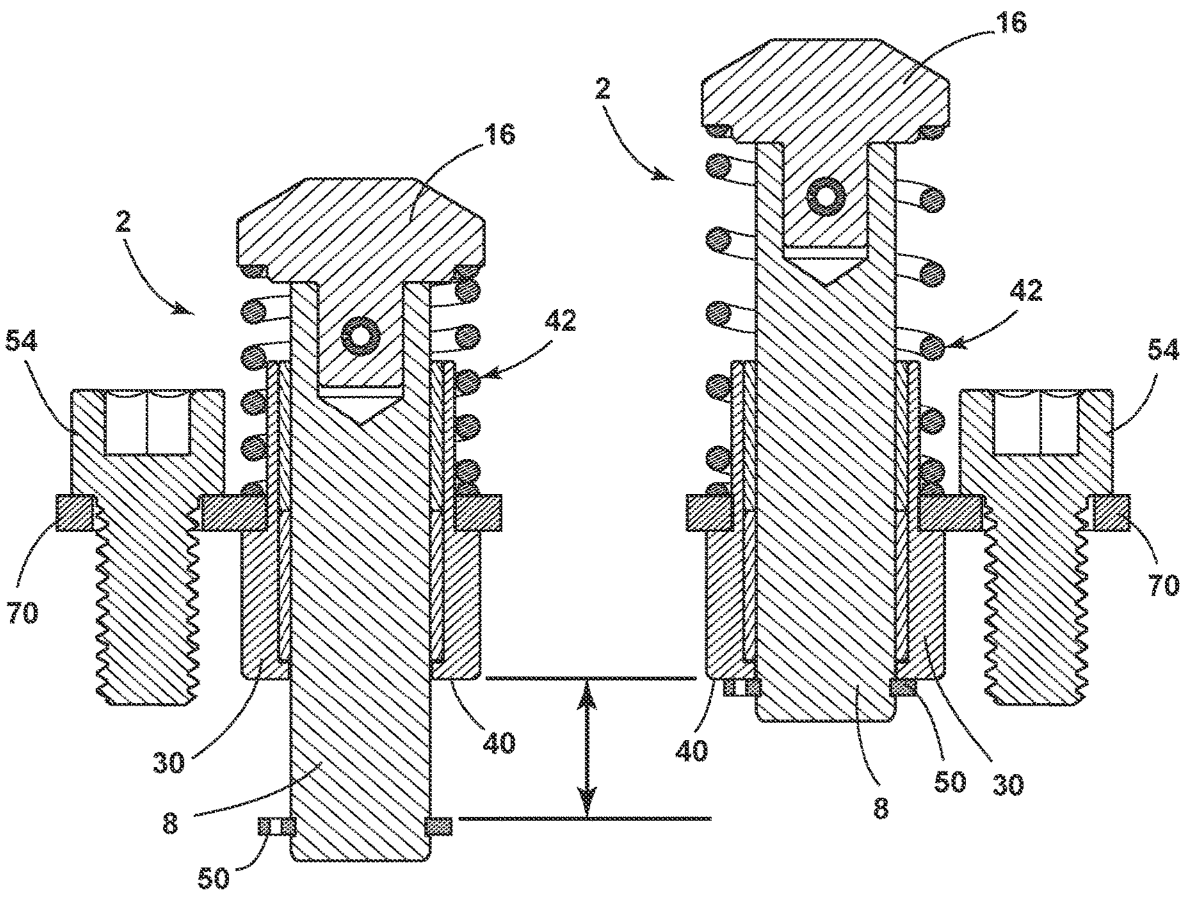
FIG. 15 is two cross-sectional views of a stock lifter assembly in compressed and raised positions.
Figure 16:
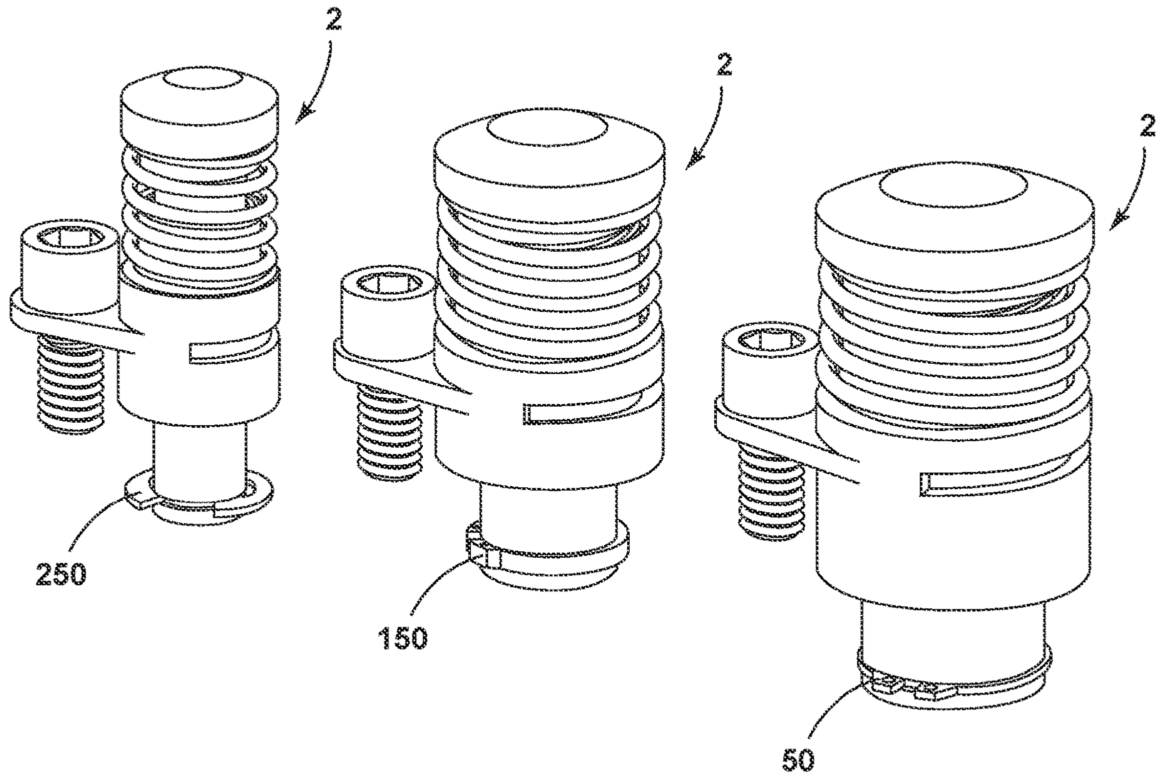
FIG. 16 is a perspective view of three stock lifter assemblies, using different retainers.

The guide pin body 4 has an outer end portion 6 oriented toward the stock 5, an inner end portion 8 oriented away from the stock 5, and a medial portion 10 therebetween. In the illustrated embodiment, the guide pin body 4 has a generally cylindrical shape, however, alternative shapes can be used. The outer end portion 6 of the guide pin body 4 has a cap aperture 12. In the illustrated embodiment, the cap aperture 12 is centrally located within the outer end portion 6 of the guide pin body 4. The cap aperture 12 has a depth that extends beyond the securing member aperture 14 that is formed in the cylindrical wall of the outer end portion 6 of the guide pin body 4. The inner end portion 8 of the guide pin body 4 includes a retainer groove 15 that is spaced away from the inner end surface 17 of the guide pin body 4. The width and length of the guide pin body 4 can be altered depending upon the desired size and desired lift of the stock lifter assembly 2. Examples of different widths and lengths of the guide pin body 4 are illustrated in FIGS. 14 and 16.

Figure 6:
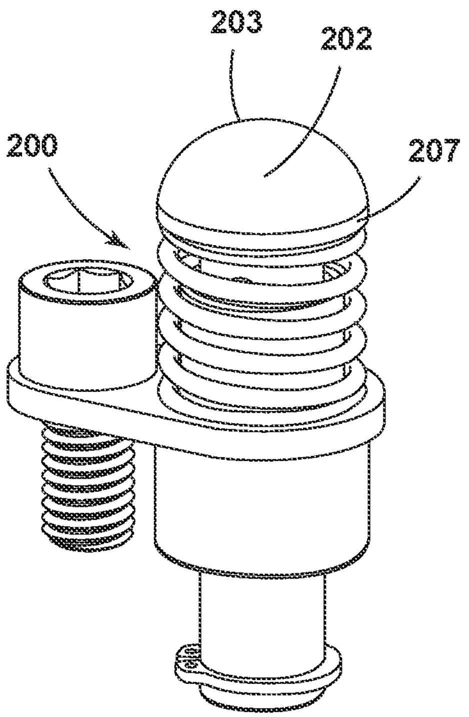
FIG. 6 is a perspective view of another embodiment of the stock lifter assembly shown in FIG. 5 with a different shaped cap.
Figure 9A:
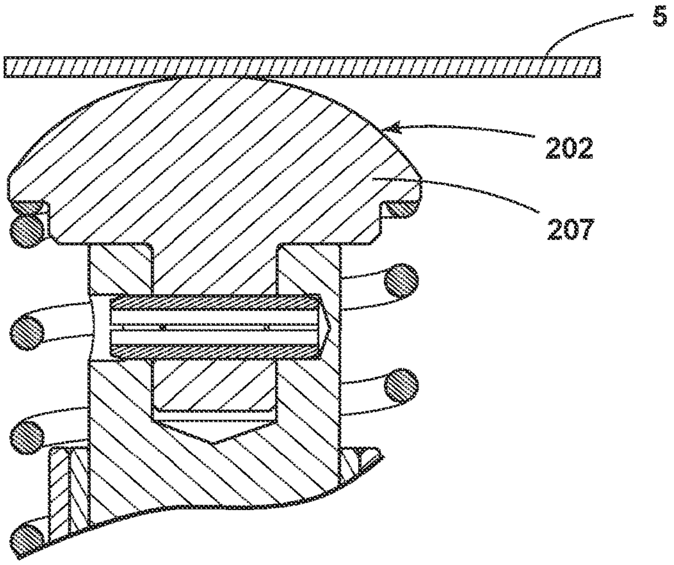
FIG. 9A is a cross-sectional view of a stock lifter assembly with a different shaped cap.
Figure 9B:
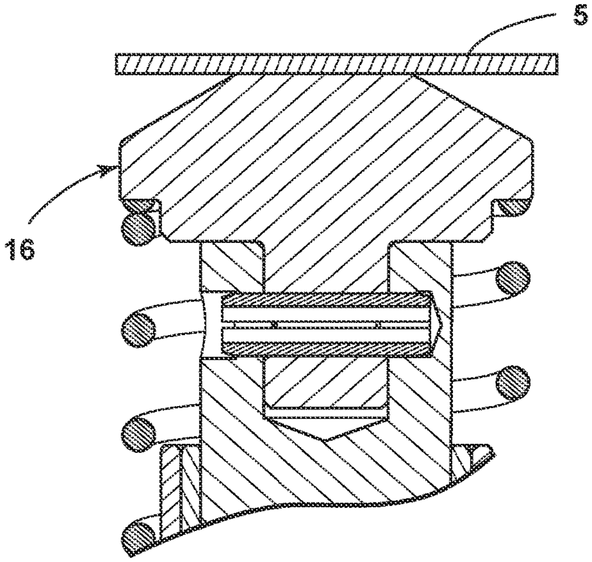
FIG. 9B is a cross-sectional view of a stock lifter assembly with a different shaped cap.
Figure 9C:
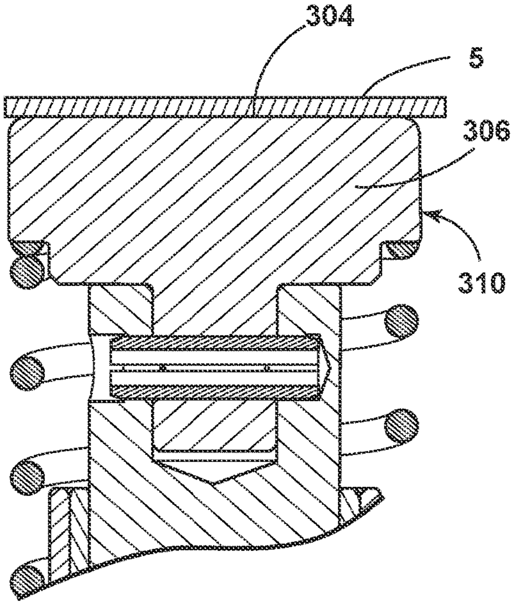
FIG. 9C is a cross-sectional view of a stock lifter assembly with a different shaped cap.

The cap 16 includes an outer end portion 18 that is oriented toward the stock 5, and an inner end portion 20 that is oriented away from the stock 5. The outer end portion 18 includes an outer end surface 22 that contacts the lower surface of the stock 5 when the stock lifter assembly 2 engages the stock 5. As illustrated in FIG. 1, the outer end surface 22 can be relatively flat and can be smaller than the remainder of the outer end portion 18 of the cap 16. The outer end portion 18 can include a surface 19 that tapers to the outer end surface 22. This surface 19 can include a straight or curved taper. Other embodiments of the cap 16, shown in FIGS. 3, 6, 9A, 9C, include different-shaped caps 102, 202, 302. For example, in FIG. 3, the cap 102 includes a curved surface 106 that leads to a relatively small, but flat outer end surface 104. FIGS. 6 and 9A illustrate a cap 102 that is entirely rounded. FIG. 9C illustrates a cap 302 that has a flat outer end surface 304 that is only slightly smaller than the remainder of the outer end portion 306. Thus, as illustrated, the exemplary embodiments, the transition from the outer end portion 18, 107, 207, and 306 to the outer end surface 22, 104, 203, and 304 can vary and can include curves, tapers, edges, and different-sized and shaped outer end surfaces.

The inner end portion 20 of the cap 16 has a diameter that is smaller than the outer end portion 18. In addition, there can be an intermediate portion 27 of the cap 16 that has a diameter that is in between the diameters of the inner end portion 20 and outer end portion 18 of the cap 16. In that arrangement, a first shoulder 29 is formed on the innermost side of the intermediate portion 27, and the second shoulder 26 is formed on the innermost side of the outer end portion 18 of the cap 16. The first shoulder 29 will contact the top surface 13 of the guide pin body 4 when the cap 16 is installed on the guide pin body 4. The inner end portion 20 of the cap 16 includes a securing member aperture 24 located on the cylindrical wall of the inner end portion 20 of cap 16. When the cap 16 is installed on the guide pin body 4, the securing member aperture 24 of the cap 16 aligns with the securing member aperture 14 of the guide pin body 4. In the illustrated embodiments, the securing member apertures 14 and 24 generally have the same diameter. However, one of the securing member apertures (14, 24) can be slightly enlarged to facilitate ease in alignment. The depth of the cap aperture 12 in the guide pin body 4 must be sufficient to accommodate the length of the innermost portion 20 of the cap 16. Specifically, the cap aperture 12 must be long enough to accommodate the length of the inner end portion 20 that extends beyond the securing member aperture 24 to the innermost surface 31.

Figure 5:
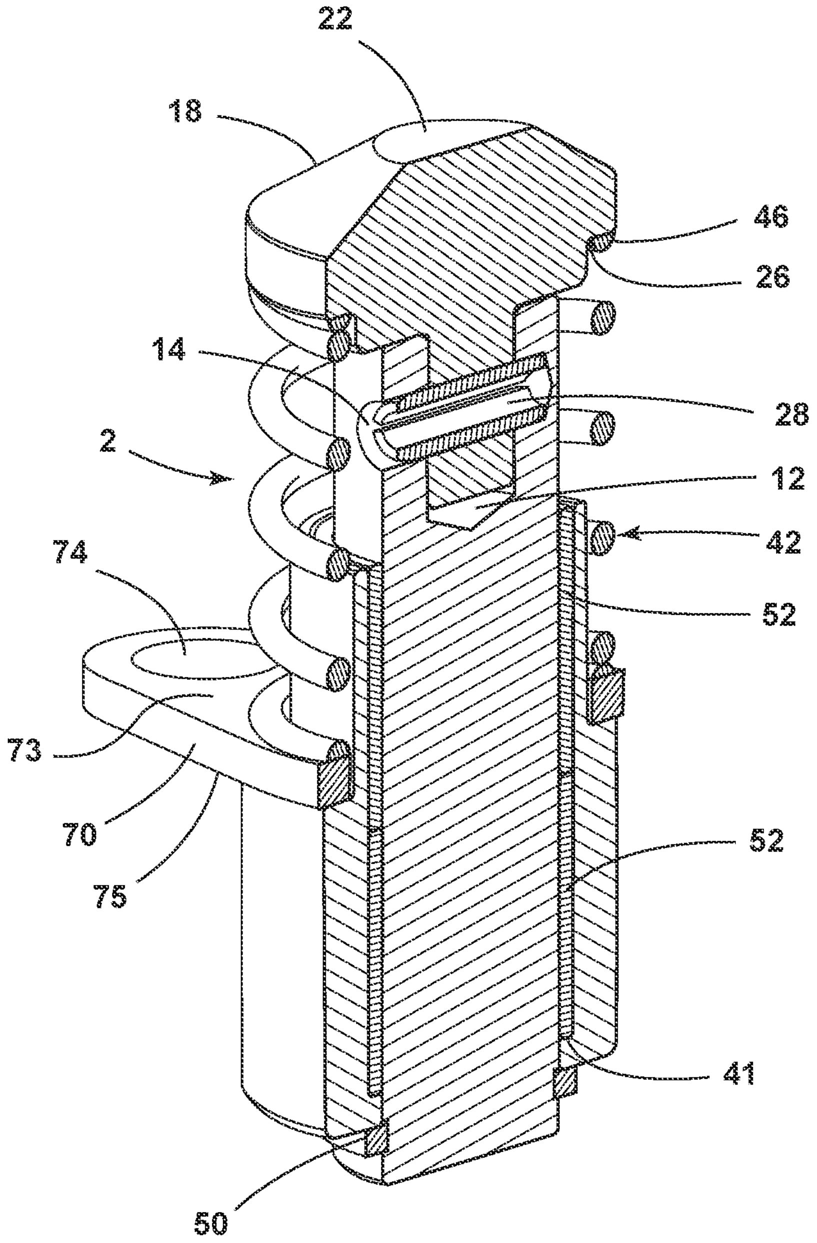
FIG. 5 is a perspective cross-sectional view of the assembled stock lifter assembly shown in FIG. 4 with optional bushings.

The spring member 42 includes a hollow interior 44 and an outer end portion 46 oriented toward the stock 5 and an inner end portion 48 oriented away from the stock 5. When the spring member 42 is installed on the assembly, the inner end portion 48 will contact the outermost surface 73 of a mounting flange 70 if the mounting flange is optionally used. If no mounting flange 70 is used, the inner end portion 48 of the spring member 42 will contact the shoulder 38 on base 30. However, other structures could be inserted on top of shoulder 38 of base 30 to contact the inner end portion 48 of the spring member 42. The outer end portion 46 of spring member 42 contacts the second shoulder 26 of cap 16, as shown in FIG. 5. If no intermediate portion 27 is present on the cap 16, then a single shoulder will be formed on the cap 16 and the outer end portion 46 of spring member 42 will contact that shoulder. If other structures are coupled to the shoulder(s) of the cap 16, the outer end portion 46 of the spring member 42 may contact that other structure.

The securing member 28 in the illustrated embodiment is a roll pin. However, the securing member 28 can be threaded and one or more of the securing member apertures 14, 24 can include a threaded surface. As illustrated in FIG. 5, the securing member 28 can extend entirely through the securing member aperture 24 in cap 16. As shown in FIG. 5, the securing member aperture 14 in the guide pin body 4 can extend into sections of the outer end portion 6 that are on opposite sides of the cap aperture 12. While the illustrated embodiments show a single securing member 28, multiple securing members 28 may be used with associated securing member apertures (14, 24). Moreover, a securing member 28 can also extend only partly into the inner end portion 20 of cap 16. In such an embodiment, the securing member aperture 24 in the cap 16 does not need to extend entirely through the inner end portion 20. Similarly, in such an embodiment, the securing member aperture 14 in the guide pin body 4 does not need to extend through the cap aperture 12 to the other side of the guide pin body 4.

The base 30 includes an outer end portion 32 oriented toward the stock 5 and an inner end portion 34 oriented away from the stock 5. The base has a guide pin aperture 36 that extends through the base. In the illustrated embodiment, the guide pin aperture is centrally located within the outer end portion 32 and inner end portion 34. The inner end portion 34 has a diameter of the outer end portion 32 thereby forming shoulder 38 on an exterior surface of the base 30. The base has an inner end surface 40 which will contact the retainer 50 when the stock lifter assembly 2 is fully raised. The base can also include an inner shoulder 41, as shown in FIG. 5. In this illustrated embodiment, the guide pin aperture 36 is wider than the diameter of the guide pin body 4.

Bushings 52 are located within the guide pin aperture 36 of the base 30 to accommodate and assist in the reciprocation of the guide pin body 4 within the guide pin aperture 36 of the base 30. The bushings 52 can be made from anti-friction or reduced-friction material and/or can include a coating to make it easier for the guide pin body 4 to move within the guide pin aperture 36.

Figure 7:
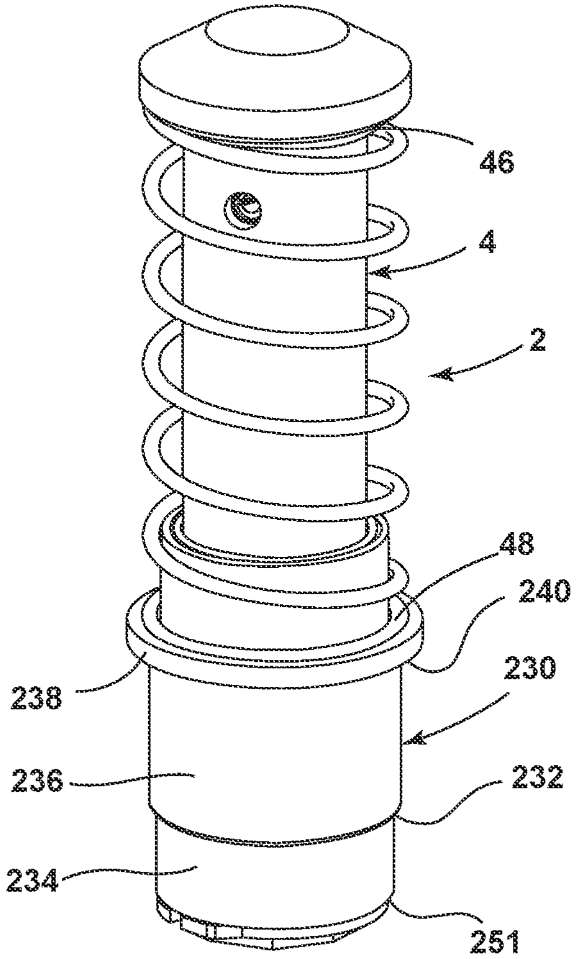
FIG. 7 is a perspective view of the stock lifter assembly of FIGS. 4 and 5 with a longer guide pin body and spring member shown without a mounting flange.

An alternative embodiment of a base 230 is shown in FIG. 7. Base 230 has multiple exterior shoulders 232, 240. Specifically, base 230 has an outer end portion 238 oriented toward the stock 5, an inner end portion 234 oriented away from the stock 5, and medial portion 236 located therebetween. The diameter of the inner end portion 234 is smaller than the diameter of the medial portion 236 thereby forming external shoulder 232. The diameter of the medial portion 236 is smaller than the diameter of the outer end portion 238, thereby forming shoulder 240. Thus, this arrangement creates a base 230 that has an additional shoulder that can be received within an associated stock lifter assembly aperture 62 in die member 3. The base 230 includes an inner end surface 251 that will contact the retainer 50 when the stock lifter assembly 2 is fully raised.

Figure 2:
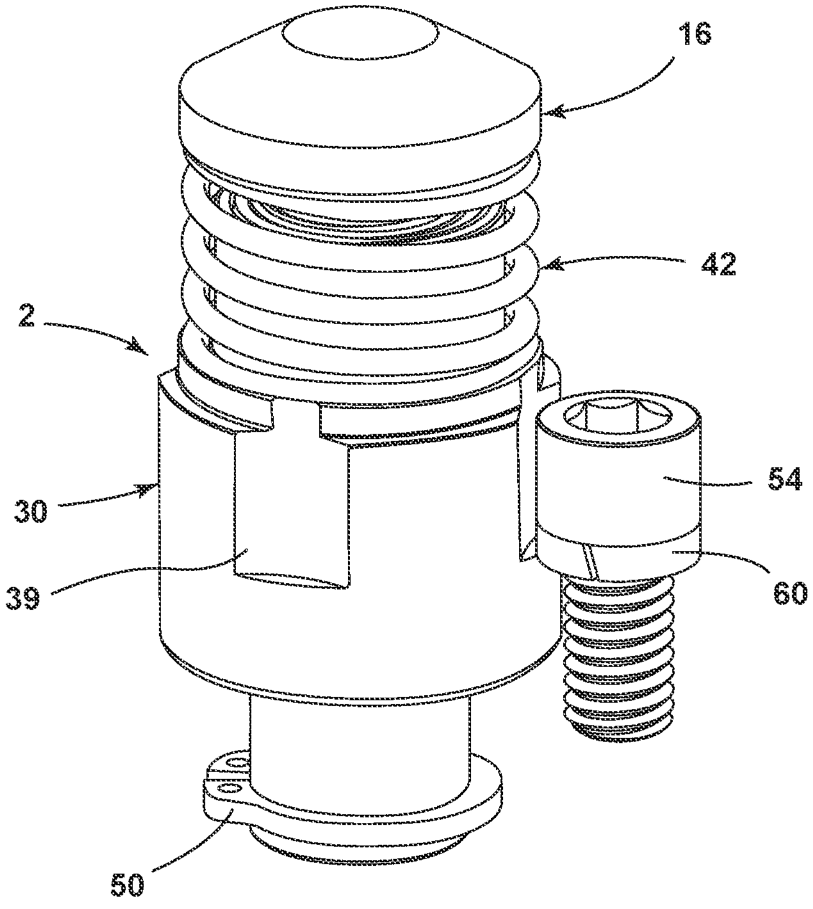
FIG. 2 is a perspective view of another embodiment of the stock lifter assembly with a different shaped fastener relief with a fastener and a standard washer.
Figure 3:
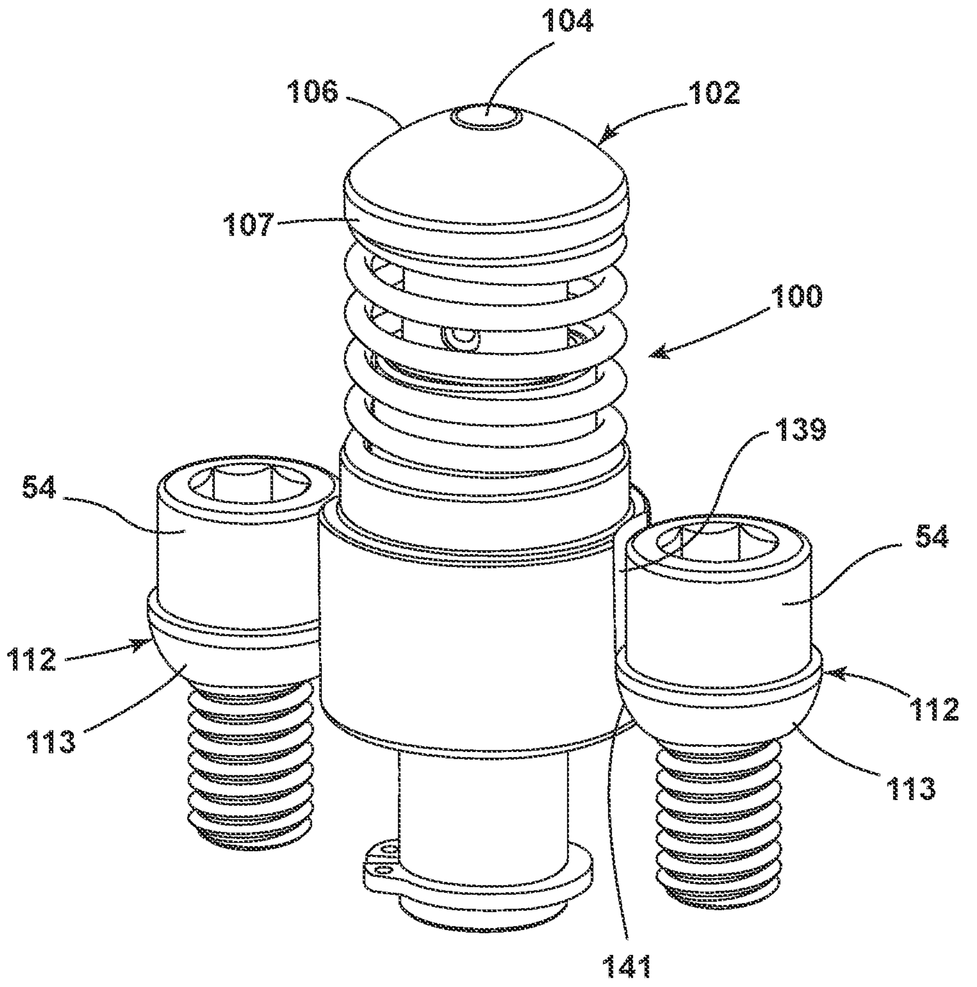
FIG. 3 is a perspective view of another embodiment of the stock lifter, with a different shaped cap and shaped fastener reliefs with fasteners using shaped washers.
Figure 13:
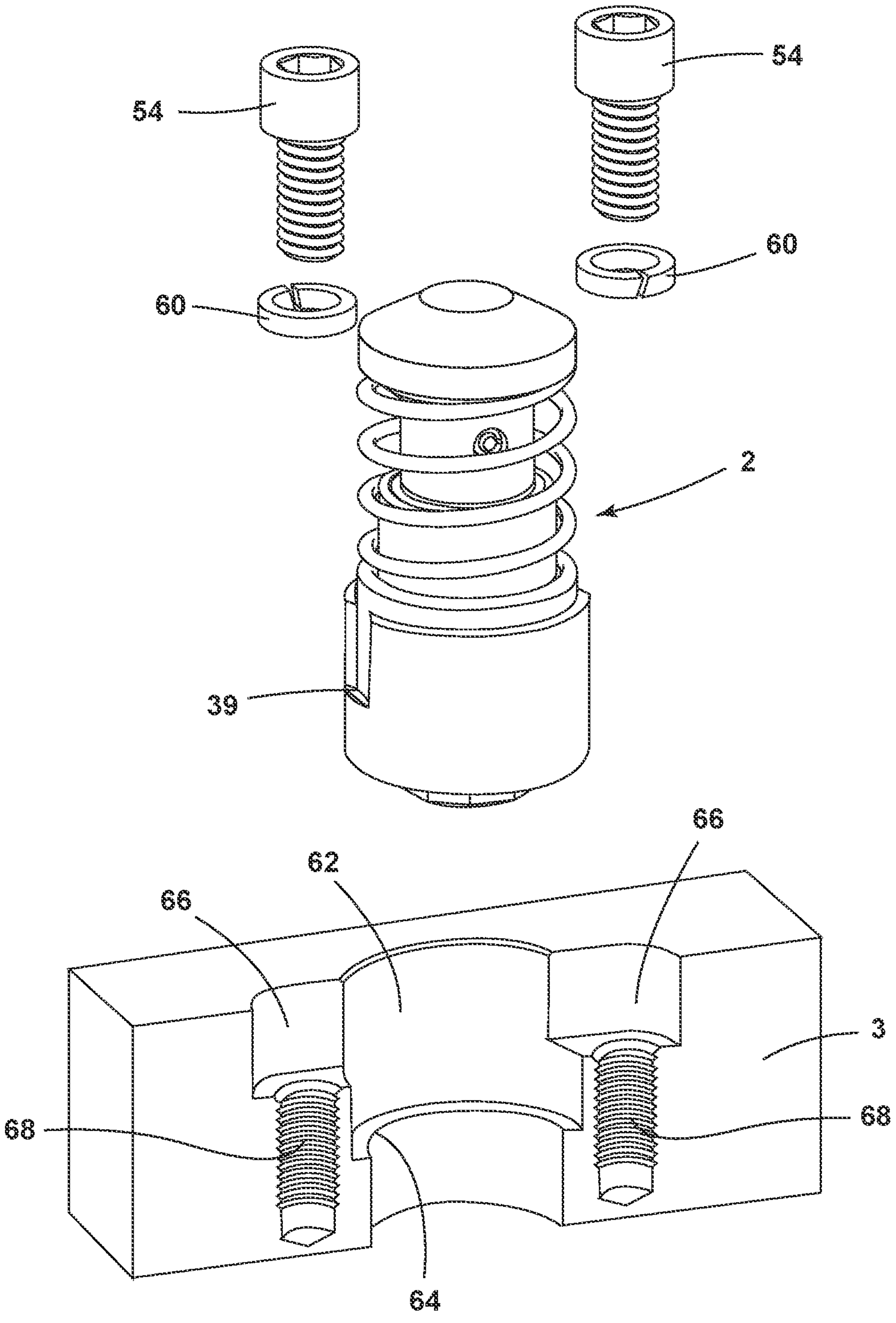
FIG. 13 is a perspective view of a stock lifter assembly before installation into a die member.

As illustrated in FIGS. 1, 2, and 13, a mounting fastener relief 39 can be formed on the inner end portion 34 of base 30. In the embodiments shown in those Figures, the mounting fastener relief 39 includes a relatively flat portion that will engage a flat surface on mounting fastener 54 or washer 60, if washers are used in the installation. An alternative embodiment is shown in FIG. 3. In that embodiment the fastener relief 139 includes a shaped surface 141 that contacts a shaped surface 113 on shaped washer 112.

Figure 8:
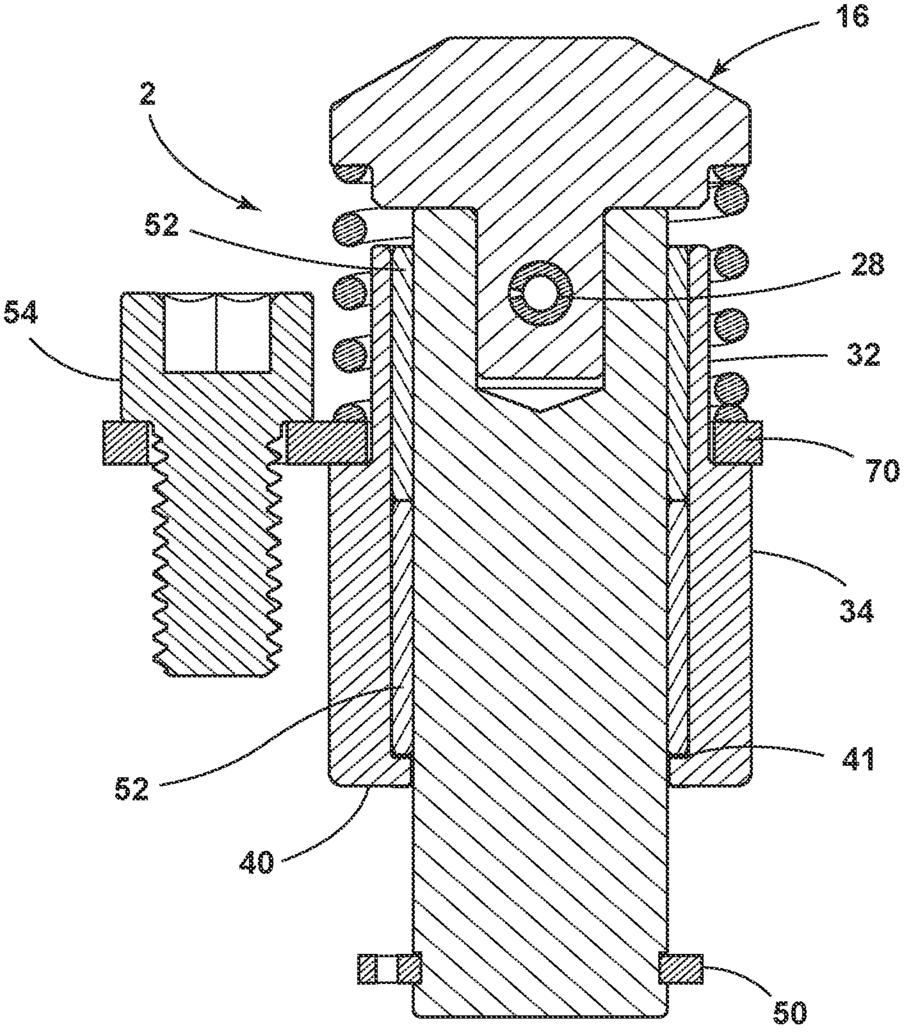
FIG. 8 is a cross-sectional view of the stock lifter assembly of FIGS. 4 and 5 with the spring member compressed.

Retainer 50 is inserted on retainer groove 15 in guide pin body 4 once guide pin body 4 has been installed into guide pin aperture 36 in base 30. When guide pin body 4 is installed in guide pin aperture 36 of base 30, a section of the inner end portion 8 of guide pin body 4 extends beyond the inner end surface 40 of the base 30, as illustrated in FIG. 8. The retainer 50 can be any type of retaining ring that will restrict the travel of the stock lifter vertically. The retainer 50 fits into retainer groove 15 on the guide pin body 4 and abuts the inner end surface 40 when the spring is relaxed, thereby limiting the travel of the stock lifter assembly 2. The guide pin body 4 cannot be removed from the guide pin aperture 36 of the cap 16 unless the retainer 50 is removed from the retainer groove 15. FIG. 16 illustrates examples of retainers, with retainer 50 being a standard, external retaining ring, retainer 150 being a heavy duty external retaining ring, and retainer 250 being an E-clip. The retainers 50, 150, 250 shown in FIG. 16 are merely exemplary embodiments of retainers. Alternative arrangements can be used with other grooves, apertures, or other structures, provided that the retaining element can be received in an inner end portion 8 of the guide pin body 4 and limit the travel of the guide pin body 4 with respect to the base 30.

FIGS. 1, 2, and 3 illustrate embodiments wherein the stock lifter assembly 2, 100 is installed into the die member 3 by use of mounting fasteners 54 that engage a surface of mounting fastener reliefs 39, 139 on the base 30. As described above, a generally flat washer 60 or a shaped washer 112 can be used with the mounting fastener 54. If a washer 60, 112 is used, the washer 60, 112 will include a surface that engages the surface of a mounting fastener relief 39, 139. If no washer (60, 112) is used, the mounting fastener 54 will contact a surface of the mounting fastener relief (39, 139). In these arrangements, the die member 3 includes a stock lifter assembly aperture 62 that has at least one internal shoulder 64 for engaging an external shoulder of the base 30. The die member 3 also has at least one mounting fastener aperture 66, with threaded portion 68 that couples with the threaded section 56 of mounting fasteners 54 when the mounting fasteners 54 are installed into the die member 3. While the illustrated embodiments show one or two mounting fasteners 54, more mounting fasteners 54 may be used.

Figure 4:
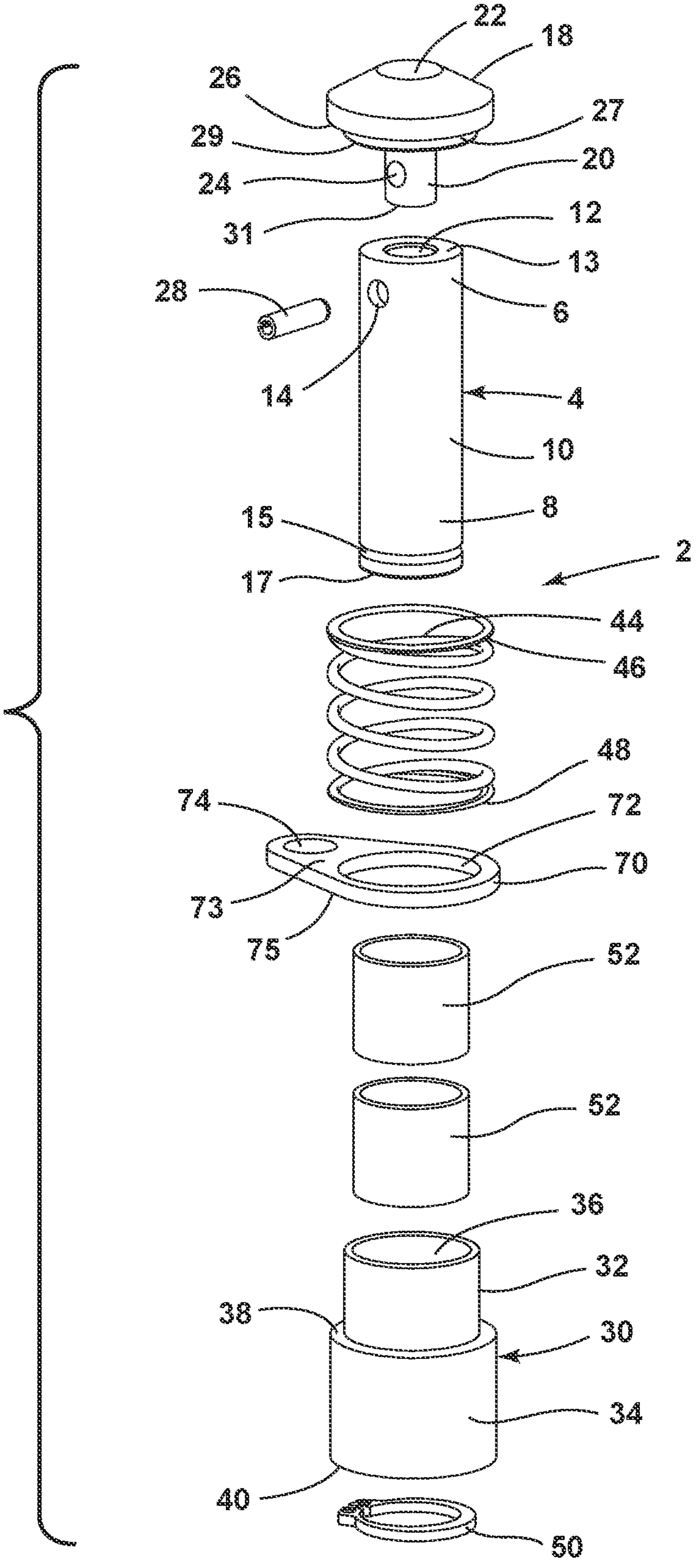
FIG. 4 is an exploded perspective view of the stock lifter assembly of FIG. 1, without any fastener reliefs in the base and the use of a mounting flange.

The stock lifter assembly 2, 102, 200, 310 can be installed to die member 3 utilizing a mounting flange 70. The mounting flange 70 includes a stock lifter assembly aperture 72 and at least one mounting fastener aperture 74, as illustrated in FIG. 4. As illustrated in FIGS. 4 and 5, when the mounting flange 70 is used, the innermost surface 75 of the mounting flange 70 will contact shoulder 38 of base 30, while the outermost surface 73 of the mounting flange 70 will contact the inner end portion 48 of spring member 42.

Figure 10:
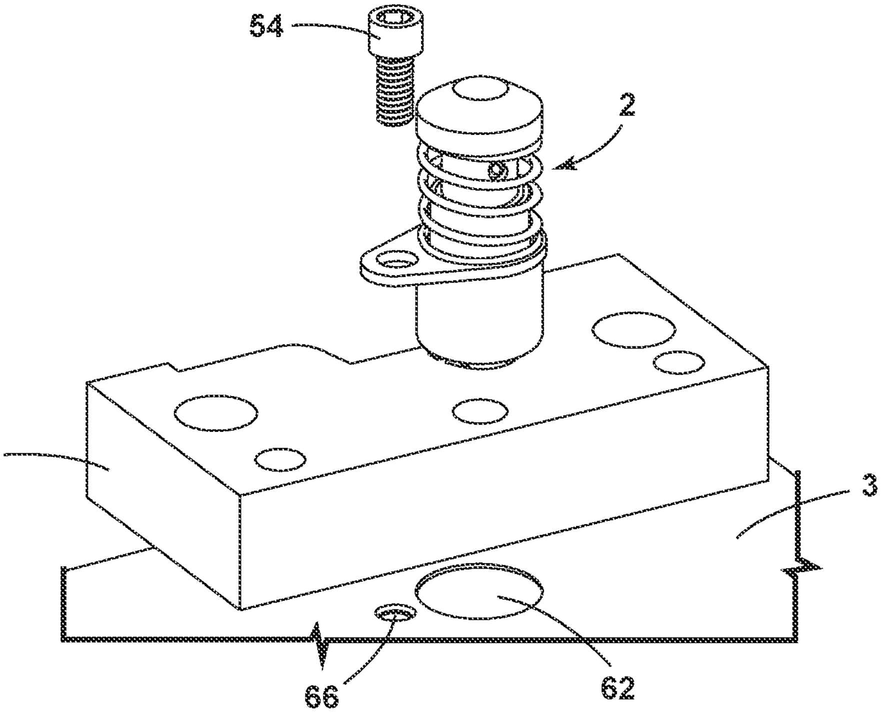
FIG. 10 is a perspective view of a stock lifter assembly before installation into a die member.
Figure 11:
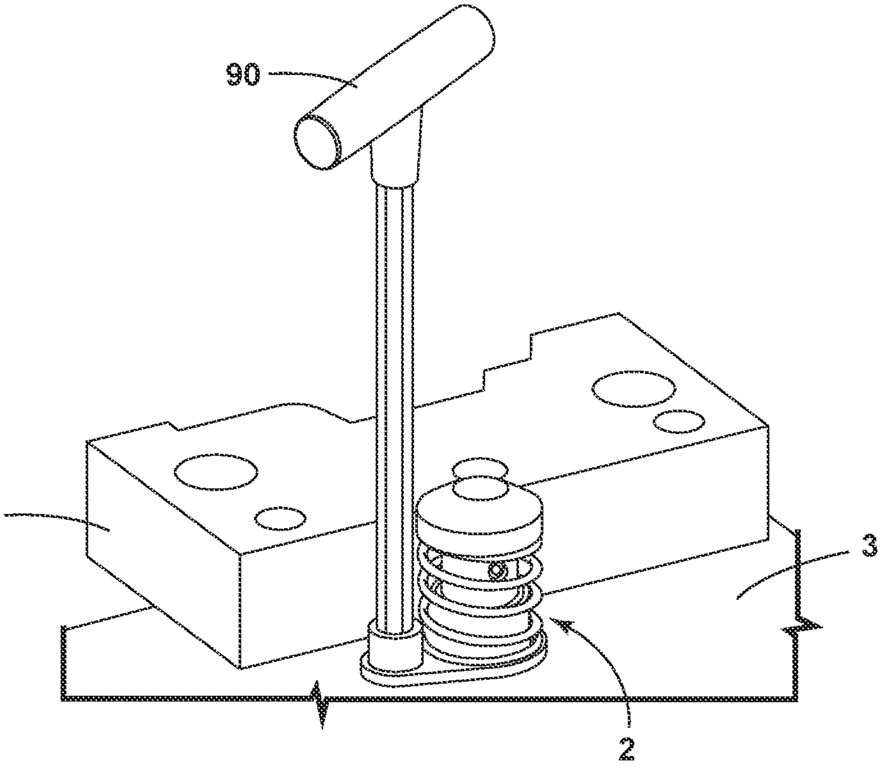
FIG. 11 is a perspective view of the stock lifter assembly shown in FIG. 10 in a die member with the tool used to install and remove the mounting fastener.

As illustrated in FIGS. 10 and 11, the stock lifter assembly 2 can be installed to a die member 3 utilizing tool 90. In the illustrated embodiment, the mounting fastener 54 includes a head 58 that has a hexagonal opening that can be received by the hexagonal shape of tool 90. As illustrated in FIGS. 10 and 11, the installation of the stock lifter assembly 2 to the die member 3 can be done adjacent to raised features 7 on die member 3. As illustrated in FIG. 11, the stock lifter assembly 2 will have a height that is above the raised features 7 when the stock lifter assembly 2 is in a fully raised position.

Figure 12:
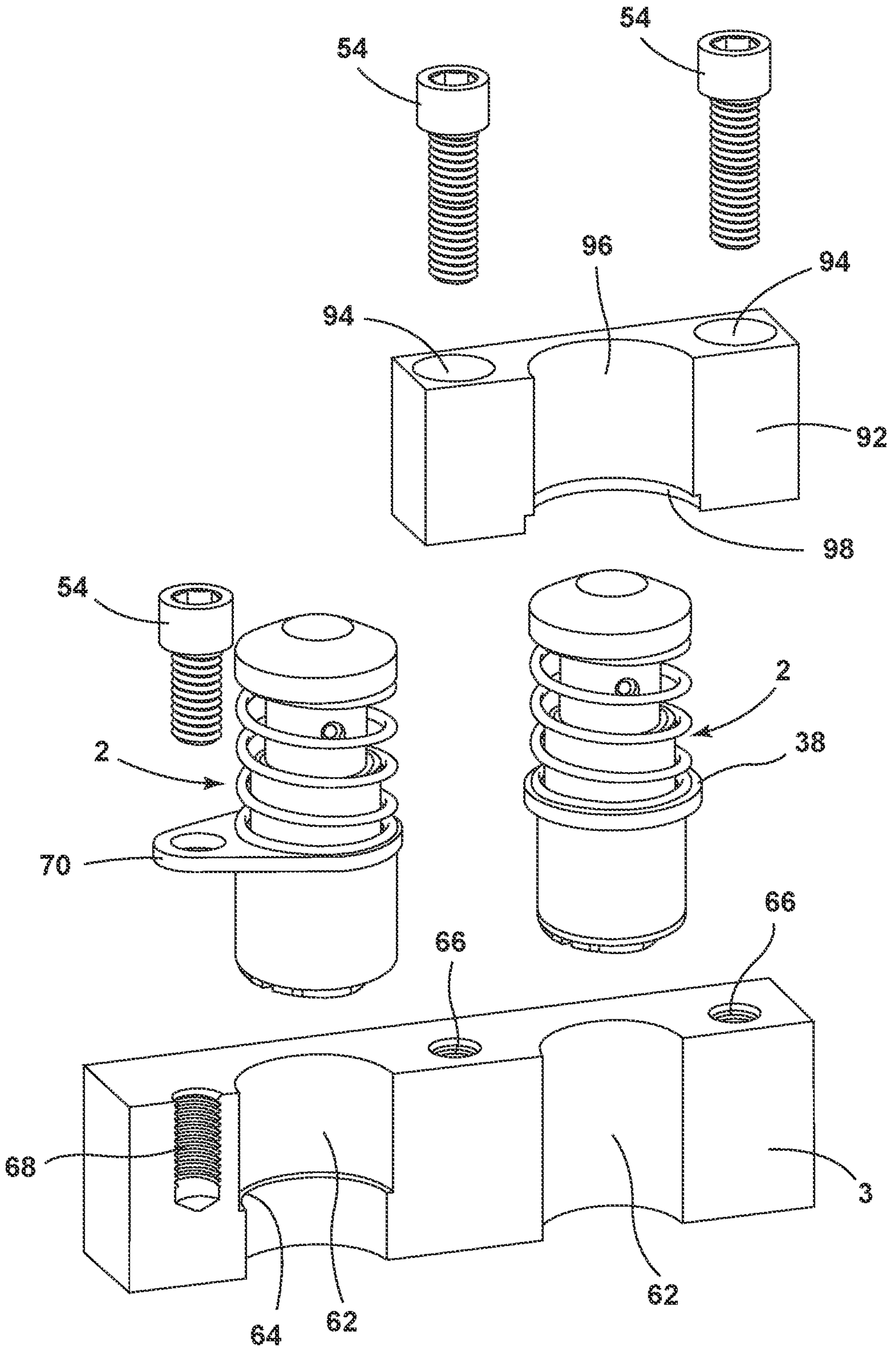
FIG. 12 is a perspective view of two stock lifter assemblies before installation into a die member, one using a mounting flange and one using a mounting block.

Another option for installing the stock lifter assembly 2 to the die member 3 includes the use of a mounting block 92, as illustrated in FIG. 12. The mounting block 92 includes a stock lifter assembly aperture 96 that has a shoulder 98. The shoulder 98 will engage the innermost side of shoulder 38 on base 30. The mounting block 92 also includes mounting fastener apertures 94. The mounting fasteners 54 will be inserted through mounting fastener apertures 94 in mounting block 92 to secure the stock lifter assembly 2 to the die member 3. The mounting fasteners 54 will be received by the mounting fastener apertures 66 in die member 3.

The guide pin body 4, base 30, and cap 16 can be made of the same material or different materials. For example, the cap 16 can be a hardened material to give it a long wearing surface for lifting and supporting the stock 5. If bushings 52 are not used, the guide pin aperture 36 of base 30 can be formed or machined to have a bearing surface.

Figure 17:
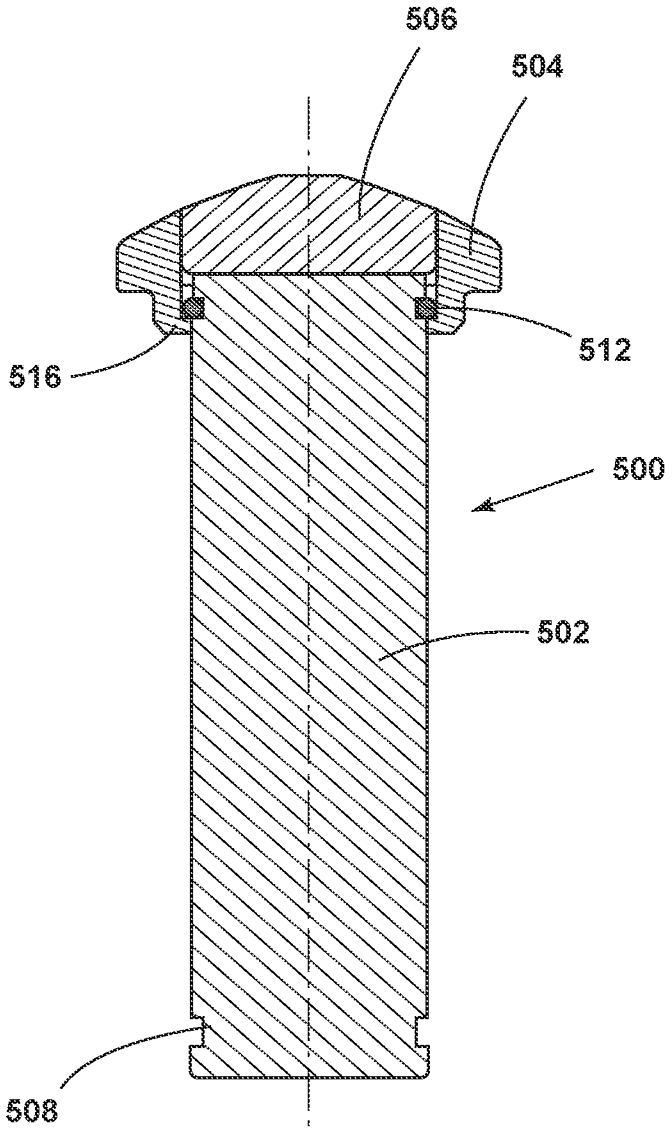
FIG. 17 is a cross-sectional view of another embodiment of a guide pin body and cap assembly that can be used in a stock lifter assembly.
Figure 18:
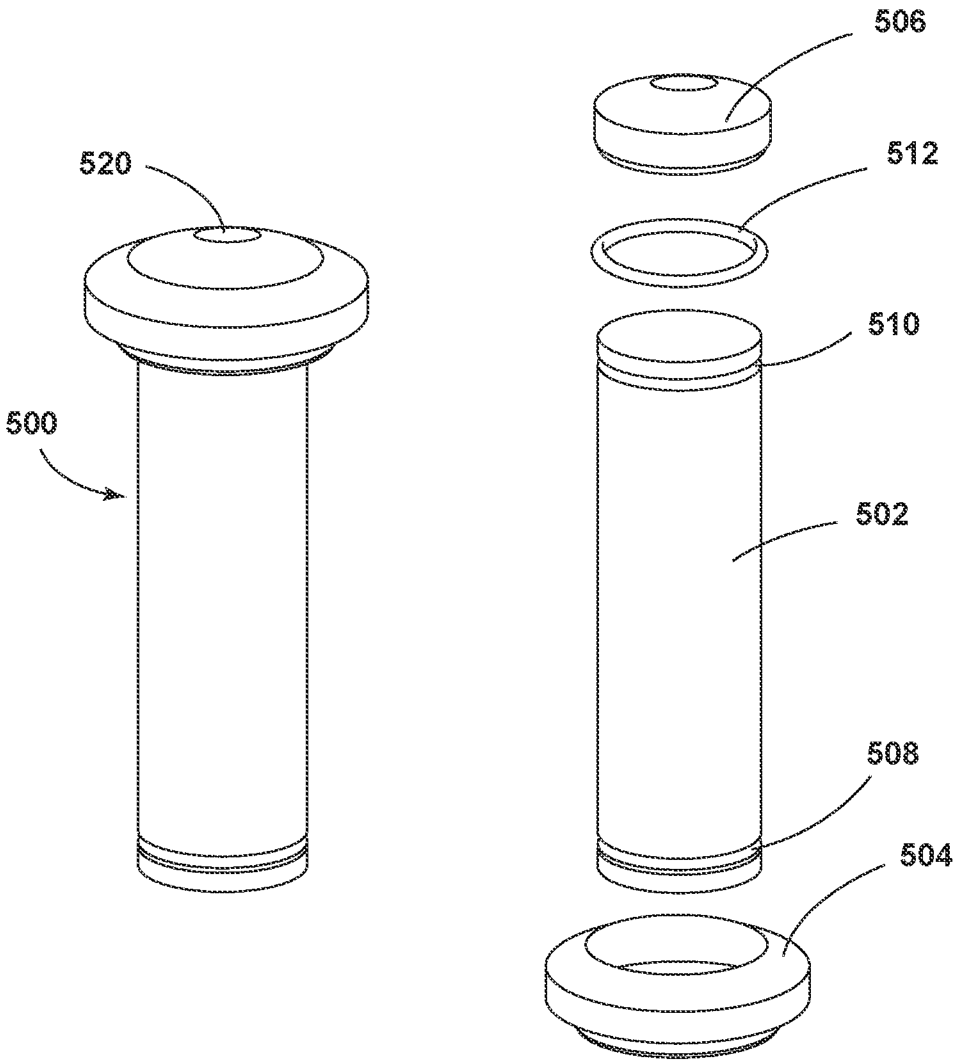
FIG. 18 is a front perspective view and an exploded perspective view of the components of the guide pin body and cap assembly shown in FIG. 17.
Figure 19:
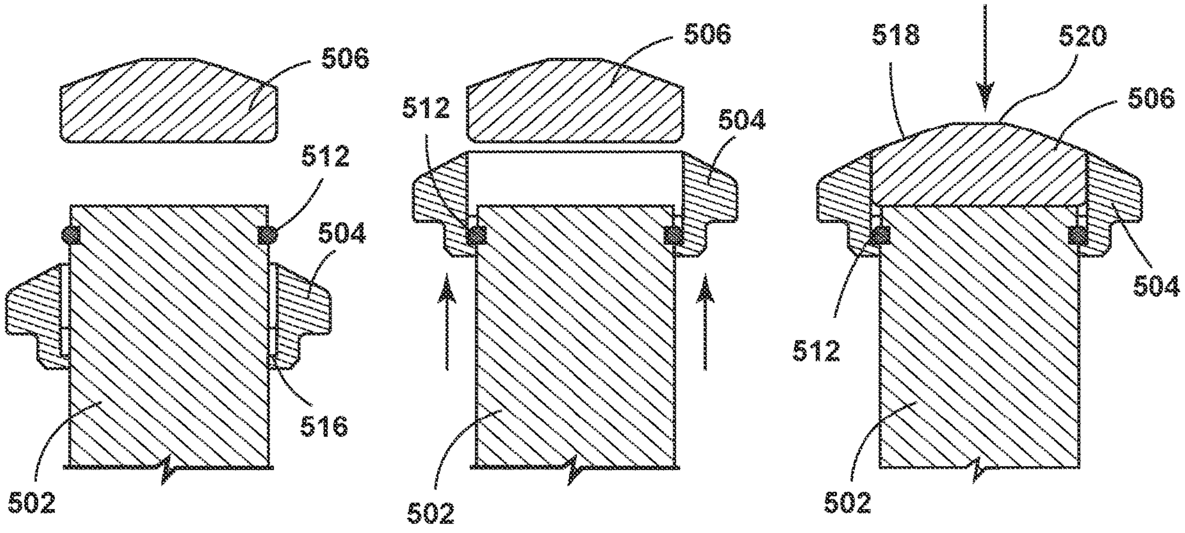
FIG. 19 is a front cross-sectional view of the assembly sequence for the guide pin body and cap assembly shown in FIG. 17.

An alternative embodiment of a guide pin assembly 500 is shown in FIGS. 17-19. The guide pin assembly 500 can be used as part of a stock lifter assembly. For example, the guide pin assembly 500 can be used in place of one of the guide pin bodies and cap assemblies described above and illustrated in FIGS. 1-16. The guide pin assembly 500 includes a guide pin body 502 with a retainer groove 508 and ring groove 510. A ring 512 is positioned in the ring groove 510 and a head ring 504 is inserted up the guide in body 502 until an internal shoulder 516 on the head ring 504 contacts the ring 512, as shown in the central image of FIG. 19. The cap insert 506 is pressed downward into the central aperture of the head ring 504, as shown in FIG. 19. The ring 512 may be a C-ring or any other suitable ring. The ring groove 510 is positioned in the outer end portion of the guide pin body 502, while the retainer groove 508 is positioned in the inner end portion of the guide pin body 502. The cap insert 506 can have a tapered section 518 and a flat section 520 that is an end surface with a diameter that is smaller than the diameter of the outer end surface of the cap insert 506.

While several of the embodiments shown above show the guide pin body 4, 502 and cap 16/cap insert 506 as separate components, the components could be a single unitary piece.

Such a single guide pin body and cap piece could be formed from machining, such as turning with lathes, casting, etc.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention is claimed as follows:

1. A multi-station progressive metal forming die having a stock lifter assembly that has at least two mutually converging and diverging die members between which a stock piece is shifted longitudinally to form at least one part from the stock, the stock lifter assembly, comprising:

- a guide pin body with an outer end portion oriented toward the stock piece, an inner end portion oriented away from the stock piece, and a medial portion between the outer end portion and the inner end portion, wherein:
  - said outer end portion includes an outer end surface with a ring groove; and
  - said inner end portion includes a retainer groove on the guide pin body;
- a cap insert having an outer end portion oriented toward the stock piece and an inner end portion oriented away from the stock piece;
- a head ring with a central aperture, having an internal shoulder, said central aperture surrounds at least a portion of said cap insert, said head ring has a width that is wider than the width of said guide pin body;
- a ring member coupled to said ring groove that contacts said internal shoulder of said head ring;
- a base having an outer end portion oriented toward the stock piece and an inner end portion oriented away from the stock guide, with a guide pin aperture extending through the base, wherein:
  - said outer end portion of said base has a first width; and
  - said inner end portion of said base has a second width that is larger than said first width, forming a shoulder on the exterior surface of said base, and an inner end surface;
- a spring member having a generally hollow interior with an outer end portion oriented toward the stock piece and an inner end portion oriented away from the stock piece, wherein:
  - said outer end portion contacts a surface of said head ring; and
  - said inner end portion contacts said shoulder on an exterior surface of said base; and
- a retainer received on said retainer groove on said inner end portion of said guide pin body, said retainer contacting said inner end surface of said base when said stock lifter assembly is fully raised.

2. The metal forming die as set forth in claim 1, wherein said guide pin aperture in said base includes:

- a portion that has a width that is larger than the width of said guide pin body; and
- an internal shoulder.

3. The metal forming die as set forth in claim 2, including:

- a plurality of bushings received within said guide pin aperture.

4. The metal forming die as set forth in claim 1, wherein said ring member is a C-ring.

5. The metal forming die as set forth in claim 1, wherein said outer end surface of the cap insert has a diameter that is smaller than the diameter of the outer end portion of the cap insert.

6. The metal forming die as set forth in claim 1, including:
a plurality of bushings received within said guide pin aperture.

7. A stock lifter assembly for a metal forming die in which stock is formed into at least one part, comprising:
a guide pin body with an outer end portion oriented toward the stock and an inner end portion oriented away from the stock, wherein:
said outer end portion includes an outer end surface with a ring groove; and
said inner end portion includes a retainer groove on the guide pin body;
a cap insert having an outer end portion oriented toward the stock and an inner end portion oriented away from the stock;
a head ring with a central aperture, having an internal shoulder, said central aperture surrounding at least a portion of said cap insert and having a width that is wider than the width of the guide pin body;
a ring member coupled to said ring groove that contacts at least a portion of said internal shoulder of said head ring;
a base having an outer end portion oriented toward the stock and an inner end portion oriented away from the stock with a guide pin aperture extending through the base, wherein:
said outer end portion of said base has a first width; and
said inner end portion of said base has a second width that is larger than said first width, forming a shoulder on the exterior surface of said base, and an inner end surface;
at least one fastener relief formed on said base;
a spring member having a generally hollow interior with an outer end portion oriented toward the stock and an inner end portion oriented away from the stock, wherein:
said outer end portion contacts a surface of said head ring; and
said inner end portion contacts at least a portion of said shoulder on said exterior surface of said base; and
a retainer received on said retainer groove on said inner end portion of said guide pin body, said retainer contacting said inner end surface of said base when said stock lifter assembly is fully raised.

8. The stock lifter assembly as set forth in claim 7, wherein said at least one fastener relief formed on said base includes multiple spaced apart fastener reliefs.

9. The stock lifter assembly as set forth in claim 7, wherein said guide pin aperture in said base includes a portion that has a diameter that is larger than the diameter of said guide pin body.

10. The stock lifter assembly as set forth in claim 9, wherein said guide pin aperture in said base includes an internal shoulder.

11. The stock lifter assembly as set forth in claim 10, including:
a plurality of bushings received within said guide pin aperture.

12. The stock lifter assembly as set forth in claim 7, wherein said ring member is a C-ring.

13. The stock lifter assembly as set forth in claim 7, wherein said cap insert includes a tapered section.

14. A stock lifter assembly for a metal forming die in which stock is formed into at least one part, comprising:
a guide pin body with an outer end portion oriented toward the stock and an inner end portion oriented away from the stock, wherein:
said outer end portion includes an outer end surface with a ring groove; and
said inner end portion includes a retainer groove on the guide pin body;
a cap insert having an outer end portion oriented toward the stock and an inner end portion oriented away from the stock and a tapered section;
a head ring with a central aperture, having an internal shoulder, said central aperture including a section that surrounds at least a portion of said cap insert, said head ring having a width that is wider than the width of said guide pin body;
a ring member coupled to said ring groove that contacts said fastener shoulder of said head ring;
a base having an outer end portion oriented toward the stock and an inner end portion oriented away from the stock with a guide pin aperture extending through the base, wherein:
said outer end portion of said base has a first width; and
said inner end portion of said base has a second width that is larger than said first width, forming a shoulder on the exterior surface of said base, and an inner end surface;
a spring member having a generally hollow interior with an outer end portion oriented toward the stock and an inner end portion oriented away from the stock, wherein:
said outer end portion contacts a surface of said head ring; and
said inner end portion contacts a surface of said shoulder on an exterior surface of said base; and
a retainer received on said retainer groove on said inner end portion of said guide pin body, said retainer contacting said inner end surface of said base when said stock lifter assembly is fully raised.

15. The stock lifter assembly as set forth in claim 14, wherein said ring member is a C-ring.

16. The stock lifter assembly as set forth in claim 14, wherein said guide pin aperture in said base includes:
a portion that has a width that is larger than the width of said guide pin body; and
an internal shoulder.

17. The stock lifter assembly as set forth in claim 14, including:
a plurality of bushings received within said guide pin aperture.

18. The stock lifter assembly as set forth in claim 14, including:
at least one mounting fastener relief formed on said inner end portion of said base.

19. The stock lifter assembly as set forth in claim 18, including a shaped washer disposed on a mounting fastener that engages a shaped portion of said at least one mounting fastener relief.

20. The stock lifter assembly as set forth in claim 14, wherein said at least one mounting fastener relief includes a plurality of spaced apart mounting fastener reliefs.

* * * * *